United States Patent
Laws et al.

(10) Patent No.: US 7,273,571 B2
(45) Date of Patent: Sep. 25, 2007

(54) MOLDED TABLE AND ITS METHOD OF MANUFACTURE

(75) Inventors: R. Dru Laws, Orem, UT (US); Kelly Black, Orem, UT (US)

(73) Assignee: MFS, LLC, Orem, UT (US)

( * ) Notice: Subject to any disclaimer, the term of this patent is extended or adjusted under 35 U.S.C. 154(b) by 57 days.

(21) Appl. No.: 10/996,697

(22) Filed: Nov. 24, 2004

(65) Prior Publication Data

US 2005/0184419 A1    Aug. 25, 2005

Related U.S. Application Data (60) Provisional application No. 60/547,490, filed on Feb. 25, 2004.

(51) Int. Cl.
*B29C 41/04*    (2006.01)
*B29C 44/06*    (2006.01)
*B29C 44/12*    (2006.01)

(52) U.S. Cl. .................. 264/45.7; 264/45.5; 264/46.4; 264/46.7; 264/54; 264/255; 264/311

(58) Field of Classification Search ............... 264/45.5, 264/46.4, 46.7, 54, 255, 311
See application file for complete search history.

(56) References Cited

U.S. PATENT DOCUMENTS

| | | | |
|---|---|---|---|
| 2,996,764 A | | 8/1961 | Ross et al. |
| 3,150,032 A | | 9/1964 | Rubenstein |
| 3,309,439 A | * | 3/1967 | Nonweiler ................. 264/45.4 |
| 3,328,500 A | | 6/1967 | Barnette |
| 3,337,662 A | | 8/1967 | Spencer |
| 3,761,554 A | | 9/1973 | Barnette |
| 3,832,264 A | | 8/1974 | Barnette |
| 3,856,451 A | | 12/1974 | Holzinger |
| 3,875,275 A | * | 4/1975 | Lemelson ................. 264/45.3 |
| 3,962,390 A | * | 6/1976 | Mori et al. ................. 264/45.4 |
| 4,325,417 A | * | 4/1982 | Boggs et al. ................. 141/98 |
| 4,560,523 A | | 12/1985 | Plumley et al. |
| 4,671,753 A | | 6/1987 | Payne |
| 4,676,041 A | | 6/1987 | Ford |
| 4,749,533 A | | 6/1988 | Payne |
| 4,952,350 A | * | 8/1990 | Duffy ........................ 264/45.7 |
| 5,011,636 A | | 4/1991 | Payne |
| 5,366,675 A | | 11/1994 | Needham |
| 5,374,180 A | | 12/1994 | Bauer |
| 5,389,316 A | | 2/1995 | Kerman |
| 5,532,282 A | | 7/1996 | Needham |
| 5,759,472 A | | 6/1998 | DeFranco et al. |

(Continued)

*Primary Examiner*—Allan R. Kuhns
(74) *Attorney, Agent, or Firm*—Thorpe North & Western (57) ABSTRACT

A plastic table structure includes a tabletop comprising a thin polymer shell layer surrounding an expanded foam core. The multiple layers of the finished tabletop are molded concurrently in a one-pass biaxial or centrifugal rotational molding process, and cured in an oven. The method includes the steps of introducing polymeric material into a mold, and rotating the mold while heating it to a first temperature so as to form a molten shell of a portion of the polymeric material on the inside of the mold. A foaming agent is introduced within the mold and mixes with a second unmelted portion of the polymeric material and distributes throughout the mold. When the mold reaches a second higher decomposition temperature, the foaming agent causes expansion of the second portion of the polymeric material, forming an expanded foam core inside the shell.

25 Claims, 3 Drawing Sheets

U.S. PATENT DOCUMENTS

| | | |
|---|---|---|
| 5,783,611 A | 7/1998 | Strebel |
| 5,876,262 A * | 3/1999 | Kelly et al. ................ 446/118 |
| 5,928,584 A | 7/1999 | Lee et al. |
| 6,024,903 A | 2/2000 | Naft et al. |
| 6,083,434 A * | 7/2000 | Strebel ..................... 264/45.7 |
| 6,180,203 B1 | 1/2001 | Unkles |
| 6,214,272 B1 * | 4/2001 | Gruenwald et al. ......... 264/255 |
| 6,245,266 B1 | 6/2001 | Ramesh |
| 6,261,490 B1 * | 7/2001 | Kliene ..................... 264/45.7 |
| 6,334,504 B1 | 1/2002 | Sato et al. |

* cited by examiner

MOLDED TABLE AND ITS METHOD OF MANUFACTURE

The present application claims priority from U.S. provisional patent application Ser. No. 60/547,490, filed on Feb. 25, 2004.

BACKGROUND OF THE INVENTION

1. Field of the Invention

The present invention relates generally to molded tables. More particularly, the present invention relates to a molded plastic table structure having multiple concurrently molded layers.

2. Related Art

There are a variety of folding tables, including folding tables with plastic tabletops, such as are used in hotels, banquet halls, public buildings, churches, temporary household use, etc. Typical folding tables have folding legs that fold against the underside of the table, to enable easy moving and storage, while minimizing the storage space required.

The tops of prior art folding tables are usually fabricated of particleboard or laminated plywood, and may include a hard surface facing on the top. These tables typically incorporate a steel frame and folding steel legs. Unfortunately, these tables present a number of common drawbacks. The edges of metal frame members can be sharp and injure the fingers of people handling the tables. Particleboard and plywood tops tend to break easily if dropped, and are susceptible to moisture, which, if absorbed, may damage the tabletop, or discolor the surface. These tops also tend to bend and flex excessively when too much weight is placed on the table, and attempts to strengthen them tend to merely add to bulkiness and weight.

To overcome some of these problems, folding tables with an aluminum tabletop have also been fabricated. Unfortunately, these tables are relatively expensive, and are also susceptible to undesirable wear and tear, producing dents and sharp edges.

Plastic materials have recently come into use for the fabrication of lightweight folding tables, including plastic tables with lightweight cores, having plastic layers or grid frameworks as reinforcing members with plastic layers in various forms. Prior plastic tables are typically fabricated by forming a skin, such as by blow molding, rotational molding, injection molding, or vacuum forming. This tends to create a weak shell. A frame may be disposed within the shell or connected to the exterior of the shell to add structural rigidity, and a plastic foam material, such as polyurethane foam, may also be injected into the shell to increase the stiffness of the tabletop. This method produces a relatively good finished plastic table structure.

Unfortunately, the number of steps and secondary processes required to form such a table are costly and time-consuming for the producer. For example, injected foams produce relatively high fluid pressures (e.g. 40-50 psi), thus requiring a very strong support structure, fixture, or mold to contain the hollow skin when the foam core is injected and expands. Consequently, injected foams are typically applied in a step separate from the table molding step because thick heavy molds capable of withstanding the post-foaming pressures are too heavy and bulky for the rotational or blow molding processes. Such molds would also be thermally inefficient, and would impose impractically large loads on molding equipment. Additionally, because the foam core is formed through injection, there is a substantial likelihood of delamination of the skin from the foam core. Finally, injected polyurethane foams are relatively expensive.

SUMMARY OF THE INVENTION

It would therefore be advantageous to have a method for producing a lightweight reinforced plastic table structure which includes fewer steps and fewer secondary processes.

It would also be advantageous to have a lightweight reinforced plastic tabletop which can be fabricated in one pass through a molding process.

It would also be advantageous to have a method for producing a plastic table structure which does not involve high pressures associated with injected foam materials.

It would also be desirable to have a method for producing a lightweight plastic table structure which produces a tabletop having an integrated structural frame.

It would also be advantageous to have a plastic table with a foam core which is less susceptible to delamination of the plastic skin from the foam core.

The invention advantageously provides a method for making a molded article, including the steps of introducing polymeric material into a mold, and rotating the mold while heating it to a first temperature so as to form a molten shell with a portion of the polymeric material on the inside of the mold. A foaming agent is distributed within the mold and comes into contact with the unmelted polymeric material. When the mold reaches a second higher temperature, the foaming agent causes expansion of some of the polymeric material, forming an expanded foam core inside the shell.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The invention advantageously provides a plastic tabletop structure that is fabricated in a mold in one pass. The method produces a multiple layer laminate which provides greatest material placement into the weakest areas. Advantageously, the tabletop of the present invention is completely formed in a mold in a single step, thereby eliminating the secondary fabrication steps normally employed in making such tables. The method produces a very strong table which is durable and resists delamination of the skin from the foam core and the frame because the skin and foam are integrally formed while at elevated temperatures. The method also allows production of a layered laminated structure with multiple densities, all produced in a one step molding process.

Figure 1:
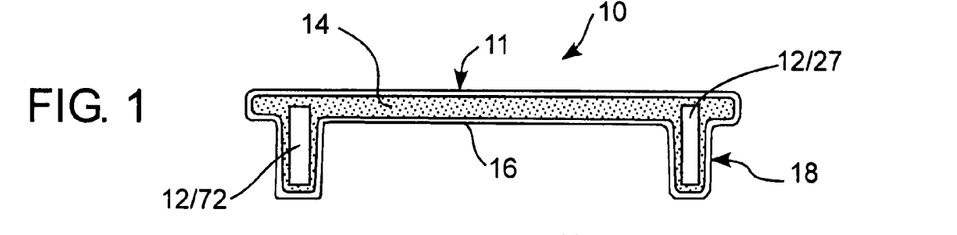
FIG. 1 is a cross-sectional view of a lightweight tabletop fabricated according to the present invention.
Figure 4:
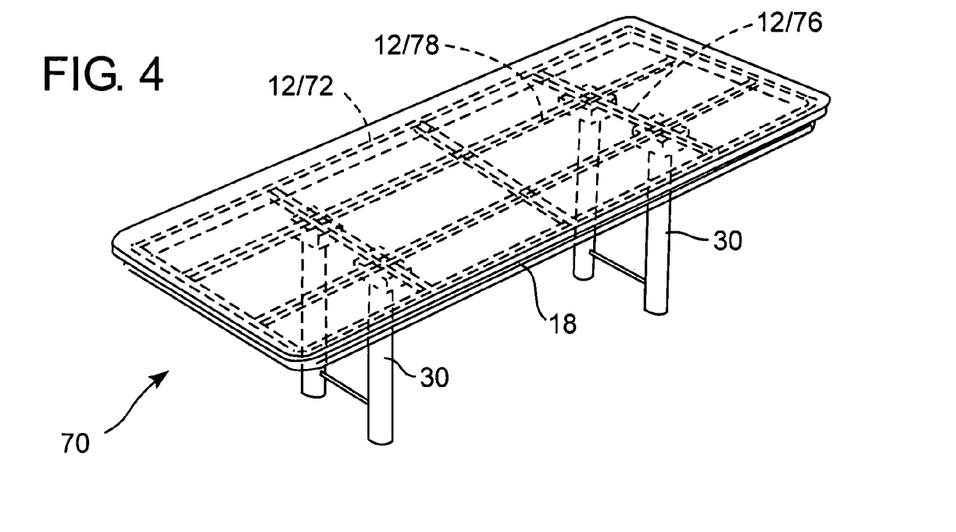
FIG. 4 is a pictorial view of a table made in accordance with the present invention.

The invention provides a table structure, one embodiment of which is shown in a pictorial view of a finished table 70 in FIG. 4. A cross-sectional view of an embodiment of a table top 10 for the table is shown in FIG. 1. The table top comprises a generally planar table top portion 11 and a side skirt 18 depending therefrom. It will be apparent that tables having other shapes and configurations can also be made in accordance with the present invention. The table top and skirt are integrally formed, having a core 14 of polymer foam material, such as expanded polyethylene foam, encapsulated in a plastic skin 16, such as a more dense polyethylene material.

Figure 7:
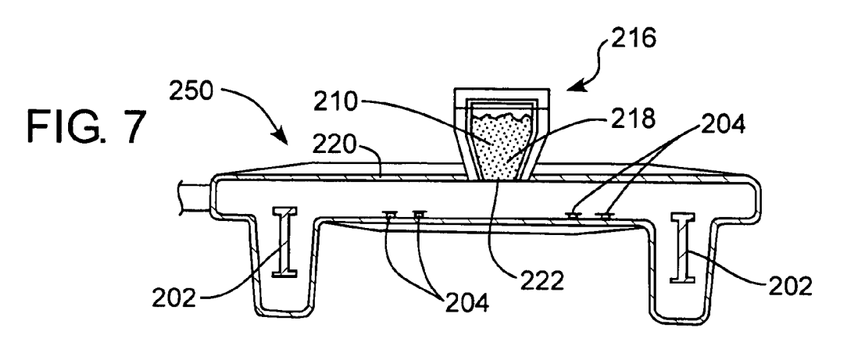
FIG. 7 is a cross-sectional view of a mold for molding a table top according to the present invention, the mold having a frame and attachment points disposed therein, and a small drop box attached to the outside of the mold for holding the foaming agent only.

The table may include frame members 12 encased within foam core, as shown in FIG. 1, or may be configured without an internal frame. The frame can be incorporated into the skirt 18, and can include members having a variety of configurations. As shown in FIG. 1, the frame can comprise members having a tubular cross-section. Alternatively, as shown in FIG. 7, the frame can comprise members having a solid cross-section, such as the I-beam 202. The structural frame may be fabricated from a variety of materials, including wood, metal, polymers, or composites. Polymers may be used for the frame so long as they are stable at and are not damaged by temperatures that will be reached during the molding process.

In the pictorial view of FIG. 4, the internal frame 12 is shown in hidden lines. It will be apparent that a variety of frame configurations may be used. The frame typically will include a perimeter frame member 72, which is usually enclosed or encased within the edge skirt 18 of the tabletop, as shown in FIG. 1. However, a table in accordance with the present invention could be configured without an edge skirt. The frame 12 may also comprise one or more transverse frame members 76, as shown in FIG. 4. These could be connected to the perimeter frame 72, where there is one. Additionally, the table may include longitudinal frame members 78. As with the transverse frame members, the longitudinal frame members could be attached to the perimeter frame and/or transverse frame members, where these are present. It will also be apparent that the table may be configured without any internal frame members at all, or may have only longitudinal frame members, such as only in the edge skirt 18 on the long sides of a table. Alternatively, the table may have a frame that extends only around its perimeter. Many framed and unframed configurations are possible.

Figure 2:
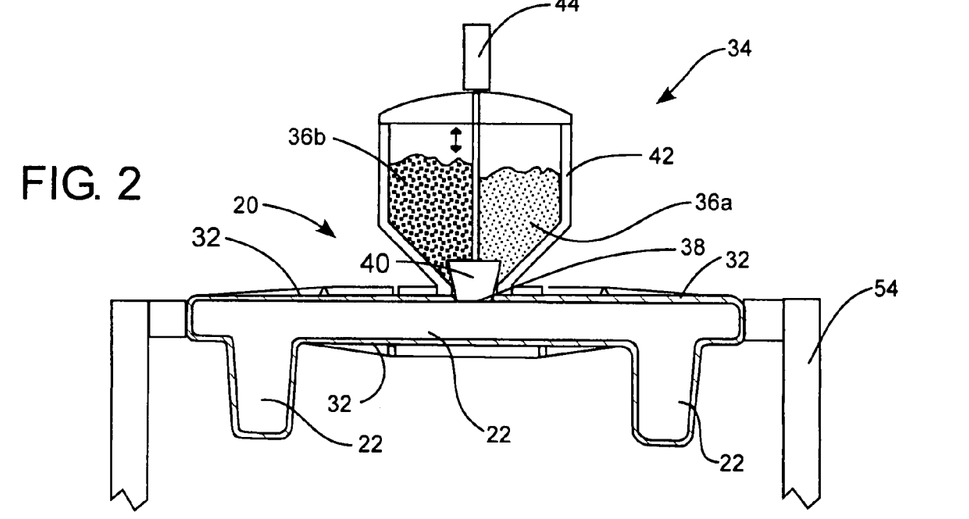
FIG. 2 is a cross-sectional view of a mold configured for forming a tabletop in accordance with the present invention.

FIG. 2 shows a cross-sectional view of one embodiment of a mold assembly 20 for producing the table of the present invention. The mold generally includes an inner cavity 22, in which the article is formed. A similar view of another embodiment of a mold 200 is shown in FIG. 7, this mold having a table frame 202 and attachment points 204 disposed within the mold prior to molding. The mold may be manufactured from a metal, such as cast aluminum or fabricated sheet aluminum, or other suitable metal or composite materials, such as steel, iron, etc. Cast aluminum is presently preferred because of its good balance between cost and heat transfer characteristics.

As shown in FIG. 2, the mold 20 can include breather tubes 32 incorporated into its walls, to allow gasses—from reactions of the polymer resins in the inner cavity of the mold during the molding process—to escape to the atmosphere. The breather tubes also serve to equalize pressures that could increase or decrease in the inner cavity of the mold during heating and cooling. While breather tubes are shown on both the top and bottom of the mold in FIG. 2, it will be apparent that breather tubes may be placed only on the top or only on the bottom, or in any other desired location.

With reference to FIG. 2, it will be apparent that the frame 12 must be supported within the mold 20 during molding. This can be done in various ways. For example, the frame may be supported by a series of pins (not shown) that are attached inside or protrude into the mold. Such pins may be of metal, and may be adjustable or removable from outside the mold. Alternatively, the pins may be of a polymer material which becomes part of the tabletop during the heating and molding process. Alternatively, the frame may be supported within the mold cavity 22 by mechanical mounts, magnetic mounts, table frame attachment points, leg frame attachment points, bolt sockets, or other mechanical fastener-related structures (not shown) which extend to or through the mold walls to hold the frame in place. The frame support system suspends the structural frame within the mold prior to and during the molding process, holding it in place as it becomes surrounded by the skin and encapsulated by the expanded foam material, as explained in more detail below. The frame support system can also allow for insert-molding of fastener systems, whether attached to an internal frame, or encapsulated within the shell 16, or within the integrally molded polymer core 14. As shown in FIG. 4, the frame suspension method can allow for the attachment of leg systems 30, and other accessories to the plastic table structure. Other mechanical supports to suspend the frame in the mold may also be used.

In the embodiment shown in FIG. 2, a canister or drop box 34 can be disposed on the outer periphery of the mold 20. Drop boxes are well known in the art of rotational molding. The drop box is configured to hold a supply of one or more raw polymer materials 36, which are allowed to "drop" or flow into the mold at a set time (or temperature) during the heating and/or cooling process. The drop box is mounted on the outer periphery of the exterior mold surface, with an access hole 38 provided from its interior chamber to the inner cavity 22 of the mold. While in FIG. 2 the drop box is shown attached to the portion of the mold corresponding to the table top, it will be apparent that it could also be attached to the bottom of the mold, and the inventors have practiced the invention in that configuration.

The drop box shown in FIG. 2 includes a plunger 40, which normally blocks the access hole 38, but when actuated by an actuator 44, draws away from the access hole to allow the materials stored inside the canister to flow into the inner cavity of the mold. The plunger may be pneumatically, electrically, or hydraulically actuated to open. Its actuation may be triggered electrically, through either a hard-wired connection, or a wireless radio frequency control system.

If desired, more than one drop box 34 may be attached to the mold 20 to allow more than one "drop" or discharge of material into the mold during the molding process. Likewise, a drop box with more than one chamber may be used for the same purpose, as depicted in FIG. 2. The drop box of FIG. 2 contains a first polymer 36*a*, which may be, for example, polymer pellets of relatively small size, and a second polymer 36*b*, which may be a polymer having larger sized particles. The walls 42 of the drop box are heavily insulated, and the materials surrounding the aperture 38 are selected to prevent adhesion of the contained polymer material thereto. The insulation allows the material contained in the drop box to remain at a lower temperature than the mold itself, for reasons which will become more apparent hereafter.

To produce the table disclosed herein, the mold assembly 20 is first opened, and, depending on the desired combination of structural, physical and aesthetic properties desired, one or more of several procedures may be followed. Typically, the inside surfaces of the open mold are first treated with a release agent, which allows the finished product to be easily removed from the mold. Suitable release agents include silicones or Teflon®. These and other suitable release agents are well known in the art, and are readily commercially available.

The frame 12 may then be inserted into the inner mold cavity 22. After insertion of the frame, raw polymer material, usually in the form of powder or pellets, is placed in the mold 20 for forming the thin polymer shell or skin 16 of the table. The exterior shell polymer may be of thermoset plastic or thermoplastic compounds, and may contain ultraviolet light inhibitors, anti-oxidants, reagents, or color additives as desired. This polymer material may be, for example, polyethylene, polypropylene, polyvinyl chloride, or composite polyester. Other materials may also be used. While the shell polymer material is usually in the form of powder or pellets, liquids may also be used, and may be sprayed onto the interior mold surface. The thin polymer layer forming the shell is intended to provide various desired properties, including color, abrasion resistance, opacity, translucence, multiple color surfaces, impact resistance, and structural strength.

In one embodiment, with the frame 12 and the polymer for forming the shell 16 in place in the mold, the mold is then closed. At this point, the drop box 34 is attached to the mold 20, having its aperture 38 in line with a corresponding aperture in the mold, and one or more raw polymer materials 36 in the form of powder or pellets are placed into the drop box(es). An actuator 44 is attached to the drop box to control operation of the plunger 40, to allow the contents of the drop box to be introduced into the mold at the proper time.

Figure 3:
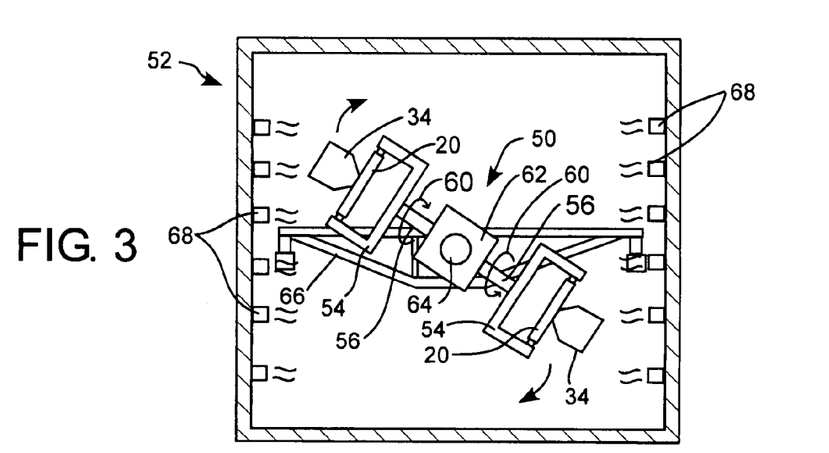
FIG. 3 is an elevation view of a rotational molding system configured for forming the table of the present invention.

When fully prepared, the mold 20 is ready to be attached to a rotational molding machine 50 and placed within an oven 52, as shown in FIG. 3. The mold assembly is mounted on a frame 54, which is fixedly attached to the end of a rotatable shaft 56. The shaft is part of the rotational molding machine, and is driven to rotate about its longitudinal axis, in the direction shown by arrows 60, by a first mechanical power source 62, such as an electric motor. The first mechanical power source for the shaft in turn is mounted on a rotatable spindle 64, which has a longitudinal axis that is substantially perpendicular to that of the shaft. The spindle is rotatably mounted on a frame 66, and is rotationally driven by a second mechanical power source (not shown), such as an electric motor. The first and second mechanical power sources for the rotatable shaft and spindle, respectively, are configured to rotate their respective elements at speeds of anywhere from about 1 rpm to about 16 rpm, though other speeds may be used. In one embodiment, the inventors prefer a speed in the range of about 6 rpm to about 8 rpm. These components thus have the capacity to simultaneously rotate one or more molds about two orthogonal axes. This is typical of common rotational molding.

As the mold 20 rotates, the polymer for forming the skin is caused to spread out within the mold. Simultaneously, the oven 52, having heating elements 68, heats the mold, which causes the polymer particles to begin to melt and adhere to the inner surface of the mold. It will be apparent that a variety of heating systems can be used for heating the oven, such as gas-fired convection systems, etc. The result of the heating and rotating is to form an exterior shell of the melted first polymer around the inner surface of the mold.

At a preset time or temperature, the drop box 34 opens, allowing a second polymer to flow into the mold. The second polymer preferably contains reagents that will cause it to "blow" or expand into the foam core 14 in a controlled manner at a predetermined decomposition temperature. This temperature may be approximately the same as the temperature at which the skin 16 forms, or it may be a different temperature. Because the drop box is thermally insulated, the temperature of the second polymer will not have reached the temperature of the mold by the time the first or shell polymer does. Consequently, the same material, e.g. polyethylene, may be used for both the shell and the foam core, the only difference being that the polymer of the core includes the blowing agent so as to expand into a foam, while the shell polymer does not. Because of the timing of their exposure to the reaction temperature, the desired reactions can occur at different times. Alternatively, the oven could be raised to the first temperature to form the shell, then allowed to cool some amount before the first drop of additional material into the mold.

Many different kinds of foams may be used. For example, two kinds of olefinic foams have been used by the inventors. Azodicarbonamide foams produce nitrogen gas ($N_2$) and carbon dioxide ($CO_2$), as the blowing agents, but also produce ammonia ($NH_4$) and carbon monoxide (CO) as byproducts. Obviously, carbon monoxide is poisonous, and ammonia has an objectionable smell, and is also toxic in large quantities. Alternatively, sodium bicarbonate-based foams have also been used, these producing carbon dioxide ($CO_2$) as the blowing agent, with no objectionable byproducts. This latter method is preferred.

Through this process, two similar (or perhaps dissimilar) materials, the skin polymer and the foam polymer, form a laminate which becomes integrally connected into a strong mass. When viewed in cross-section and on a magnified scale, the unexpanded material of the shell 16 gradually transitions into the expanded foam material of the core 14, such that there is no distinguishable interface between the two materials. To the naked eye, the transition from the non-expanded shell to the expanded foam core material does not appear gradual. However, because the core material and shell material are placed and cured together and may be the very same type of material, the transition from one to the other primarily represents a change in density, rather than an interface between two materials. Consequently, there is no weakened interface between the shell and the core, thus greatly reducing the problem of delamination of the skin from the foam core, even when subjected to heat and other stress.

One advantage of this method is that olefinic foams are substantially less expensive than injected foams, such as polyurethane foam. Thus, the method of this invention allows less expensive foam materials to be used for lightweight table cores which could not be used before. Olefinic foams with the blowing agents previously discussed also produce far less fluid pressure (~5 psi) than injected urethane foams (which produce ~40-50 psi), thus allowing their use in relatively lightweight and less expensive rotational molds. The "blowing" or foaming reaction of sodium bicarbonate-based foams is an endothermic reaction. However, exothermic foaming agents can also be used in accordance with the method of this invention.

Many "drops" of polymer materials, colors, or reagents may be made into the mold cavity as desired, whether from a single drop box having more than one chamber (as in FIG. 2), or from multiple drop boxes (not shown). For example, after the first polymer material is allowed to form the shell 16, a second shell polymer material may be dropped into the mold, to form a second shell layer (not shown) inside the first. Thus one or more additional layers of polymer may be deposited inside the outer shell layer. The second and subsequent layers of polymers are preferably of such a characteristic that each layer will mold, in sequential order, after the primary shell has been formed.

The heating cycle heats the mold and its contents at a controlled rate from room temperature up to a certain maximum temperature, depending on the specific properties of the polymer materials that are being used. In one embodiment of the invention, using polyethelyne for the shell material, the temperature at which the shell begins to form is about 270° F., and the temperature at which the foam core forms is about 310° F. However, with other materials, the temperatures will differ. The melt temperature of nylon, for example, whether for the shell or the foam core, is between about 347° F. and 509° F. The temperature may remain at certain plateaus during the heating cycle to allow certain processes to take place before triggering others.

A variety of different materials can be placed into the mold at the beginning of the process (without using a drop box) and still produce the different layers. Where the different materials have different properties, they can form successive layers of the table, including both shell materials and core materials even while intermixed. For example, each shell layer material may have a slightly different melt temperature, such that they will melt and adhere to the inside of the mold (or the preceding material) at different times during the molding process. Alternatively, the polymer pellets may be of the same type, but of various sizes, each size melting and reacting at different times. In general, the smaller the pellet or particle, the faster the melt—similar to a time-release system.

The maximum temperature may be maintained for some period of time to allow the desired reactions to go to completion, or upon reaching the desired temperature, the heating cycle may be immediately discontinued. In one embodiment of the invention, the heating cycle lasts approximately 25 minutes. When the heating cycle is completed, the mold assembly 20 is removed from the oven 52, and placed in a cooling area (not shown) for a given time period. For example, the cooling cycle may last for about 25-35 minutes in various embodiments of the invention. While the mold is cooling, additional material drops may be made in the inner cavity of the mold. After cooling, the molded part is removed, and the process can be repeated.

The method as described produces a combination of a foam core 14, encapsulated within a polymer shell 16 having one or more layers, to produce a plastic table that is very strong and has high impact resistance. Advantageously, the foam core and polymer skin may be of the same or different species of materials, though in different forms or densities (i.e. foam vs. higher density skin), thus providing an integral transition from the core to the skin, and thereby drastically reducing the possibility of delamination.

The table structure can also be modified with a variety of cosmetic and functional features. For example, inserts of various kinds (not shown) can be placed into the mold 20 before molding, so as to be incorporated into the finished table. These may include laminate inserts for the tabletop, protective edge bands, facia pieces, and the like. For example, a layer of ultra-thin Corian® or other durable laminate material could be placed into the mold to provide a tabletop that has superior surface qualities in an inexpensive polymer shell. This process could be used to produce things such as laboratory benches, and highly impermeable surfaces for use where granite and other such materials are currently used. It will be apparent that laminates and other such additions could also be applied to the finished tabletop after the molding process is complete.

Figure 5:
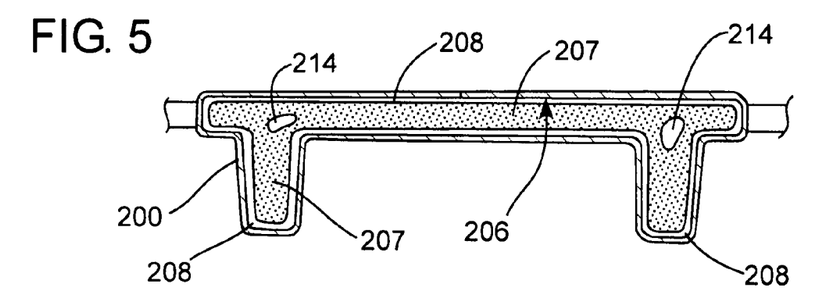
FIG. 5 is a cross-sectional view of a mold during the molding process, having a molten polymer shell formed against the inside of the mold and a plurality of unopened foaming agent containers inside the mold.
Figure 6:
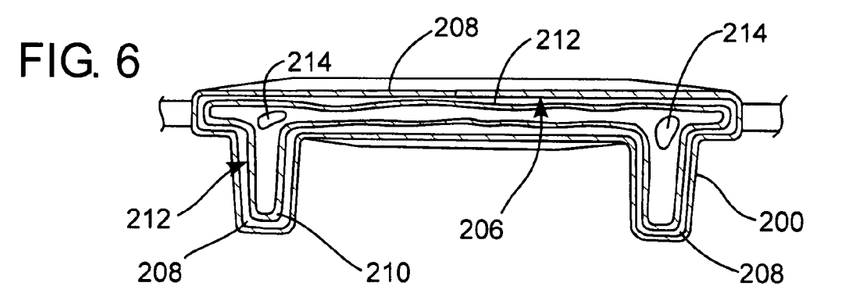
FIG. 6 is a cross-sectional view of the mold of FIG. 5 further along in the molding process, with the foaming agent containers having dispersed their contents, the foaming agent having mixed, as a result of mold rotations, with a portion of the polymer material of the shell and formed a "second skin" on the inside of the polymer shell.

Another method for making a molded table having multiple concurrently molded layers in accordance with the present invention involves adding all polymer material to the mold at the beginning, then later adding only a blowing agent. Some of the unique steps in this method are illustrated in FIGS. 5-7. Viewing FIGS. 5 and 7, there are shown cross-sectional views of two different embodiments of a mold 200 during this process. In this method, substantially all of the polymeric material for both the shell and the foam core is placed inside the mold at the outset, before the mold is initially closed. Reinforcing members, such as a table frame 202, attachment point devices 204 (e.g. threaded connectors for connecting table legs or other external structure to the molded article), etc., can be placed into the mold at the outset so as to become substantially encased within the polymer shell and/or the foam core during the rotational molding process, as described below.

Once the mold 200 is provided with the polymer material (and reinforcing members, if desired), the mold is then rotated and heated in the rotational molding apparatus, as described above. When the mold reaches a sufficient temperature, a portion of the polymer material begins to melt and adhere to the inside surface 206 of the mold so as to form a molten outer shell 208 of the polymeric material on the inside of the mold. Because of the continuous rotation about multiple axes, the polymer material spreads throughout the inside of the mold, so that the molten shell covers all parts of the inside of the mold.

After the desired polymer shell 208 has formed, the blowing or foaming agent 210 alone is then dispersed within the mold (rather than the foaming agent mixed with additional polymer material), and allowed to mix with a predetermined quantity of unmelted polymer powder 207 inside the molten polymeric material of the shell. The polymer material initially placed into the mold is of sufficient quantity for forming both the polymer shell and the foam core of the finished table. However, it is desirable to allow only the portion of the polymer material that will ultimately form the polymer shell 208 (usually about half of the total quantity of polymer material) to melt before exposing the foaming agent, so that the foaming agent will mix with the remaining unmelted powder 207. The foaming agent 210 is preferably in powder form, and spreads throughout the mold as the mold rotates, the powdery foaming agent mixing with unmelted polymer material inside the molten polymer shell. In this method, as with the methods described above, the foaming agent can be an azodicarbonamide foaming agent, a sodium bicarbonate-based foaming agent, or some other foaming agent or combination of foaming agents.

Advantageously, the foaming agent 210 mixes with the unmelted polymer material 207 inside the outer shell 208 and distributes throughout the mold 200 as the mold continues to rotate. The process is controlled so that the foaming agent is given sufficient time to mix with the unmelted polymer material and distribute throughout the inside of the shell. Continued heating of the mold during this process causes the mixture of polymer and foaming agent to melt and create a "second skin" 212 inside the outer shell. This condition is depicted in FIG. 6.

After the foaming agent 210 and polymer material have been allowed to mix, distribute throughout the mold, and melt to form the "second skin" 212, the mold 200 is then heated to a higher temperature (a decomposition temperature) sufficient to initiate the foaming reaction. When the decomposition temperature is reached, the foaming reaction begins, and the "second skin" of polymer material mixed with foaming agent expands into the interior of the mold, substantially filling the shell with expanded foam polymer material, and surrounding and encasing the frame 202. When sufficient time has passed for the foaming reaction to go substantially to completion, the mold is removed from the oven and allowed to cool as it continues to rotate. The end result is a molded polymer article like the table 10 shown in FIG. 1.

As noted above, there are several methods for introducing the foaming agent 210 into the mold 200 during the molding process. In one embodiment, the foaming agent is introduced into the interior of the mold from an external container, such as a drop box 216 attached to the exterior of the mold. This can be a conventional drop box, like that depicted in FIG. 2 and described above, wherein the drop box includes an opening in communication with the interior of the mold, the opening being covered by a mechanical device, such as a door, plunger, or valve, that can be opened at will to allow the contents of the box to flow into the mold. Because of the packing density of the foaming agent, when using a drop box it may be desirable to combine the foaming agent with a small amount of polymer material to allow it freely to flow from the drop box. A 50/50 ratio of foaming agent to polymer material can be used. For example, for a 72" long by 30" wide banquet table, only 8 ounces of foaming agent is required. If polymer material is pre-mixed with the foaming agent, only about another 8 ounces of material is required. Advantageously, because only the foaming agent and a small quantity of polymer material are being dropped into the mold, rather than the foaming agent mixed with a larger quantity of polymer material, the drop box can be quite small. The drop box would have to be configured to hold 10.5 pounds of blowing agent and polymer material combined, if the foam core polymer and foaming agent were to be dropped together.

As an alternative to a drop box with a mechanically actuated opening, the opening 218 between the mold 200 and the drop box 216 can be covered by a barrier 222 (i.e. a fusible membrane) that is configured to predictably fluidize (i.e. melt) to allow introduction of the foaming agent 210 into the mold. Such a drop box is depicted in FIG. 7. The fluidizable barrier can be of a polymeric material that is selected or configured to melt at a known temperature, so that the contents of the drop box will be distributed into the mold at a specific temperature. In one embodiment, the meltable polymer barrier is of the same species as the polymeric material of the shell 208, so that the material of the melted barrier will substantially mix with and become an integral and substantially indistinguishable part of the molded article. The barrier simply melts and becomes part of the molded article, presumably part of the foam core.

There is yet another alternative method for causing the foaming agent alone to distribute within the mold. The apparatus for this method is depicted in FIGS. 5 and 6. In this method the foaming agent 210 is sealed in one or more meltable containers 214—e.g. a bag, capsule, etc.—that are placed into the mold 200 at the outset of the process, at substantially the same time as the polymer material for the shell 208, prior to closing the mold to commence rotating and heating it. The meltable containers are configured to melt at a known temperature, so as to release the foaming agent within the mold at a predictable time. Thus, as the mold initially rotates and heats up, the containers of foaming agent simply tumble around within the mold while the polymer shell forms on the inside of the mold. This condition is depicted in FIG. 5.

Once the melt temperature of the container 214 is reached, the container melts and the powdered foaming agent 210 distributes and mixes with unmelted polymer material 207 inside the polymer shell 208. As heating and rotating continue, the mixed foaming agent and polymer material distribute throughout the mold and melt to form a "second skin" inside the molten outer polymer shell, as described above. This condition is depicted, in FIG. 6. When the foaming or decomposition temperature is reached, the foaming reaction then takes place, and a foam core fills the interior of the shell. In one embodiment, the material of the meltable container is of the same species as the polymeric material of the shell, so that the material of the melted container will mix with and become an indistinguishable part of the molded article, as described above with respect to the meltable barrier.

The use of a meltable container of foaming agent provides several advantages. First, no drop box is required. This simplifies the mold and the molding process. The container of foaming agent is placed in the mold at the beginning of the rotational molding process, along with the polymeric material for the shell and core, before the mold is closed. There is no need to drop additional material into the mold during the process, no bulky drop box attached to the mold, and no unsightly marks on the finished product at a drop box connection point. Control of the molding operation primarily involves control of the rate of temperature change so as to allow materials to adequately distribute within the mold and for each reaction to take place at the desired time.

Another advantage of using a meltable container is that the container can be of a discrete standard size, so that a number of meltable containers are selected and placed into a mold, depending upon its size. This specific configuration is depicted in FIG. 5, wherein two meltable containers 214 are shown within the mold 200. Where a manufacturer makes several different sizes of molded articles, such as tables, the meltable containers can be produced in a small size that represents the smallest common denominator of foaming agent quantity needed for any article that is to be produced. When preparing a mold of any size, the user simply selects and places into the mold a number of meltable containers that will together provide the required volume of foaming agent. More specifically, the size of the meltable containers can be smaller than the smallest foaming agent quantity needed for any article so as to accommodate molds that do not call for an exact multiple of the smallest foaming agent quantity. The use of multiple meltable containers can also provide more even distribution of the powdered foaming agent within the mold in a given time.

Another advantage of introducing only foaming agent into the mold is that the resulting foam core layer will be of the same color as the shell layer because it is formed of the same material. This can be particularly advantageous for thinner shell layers or powders with poor color dispersion. Another advantage is that the skin-to-foam transition is very unnoticeable. The molding method of this invention provides an actual transition from foam to shell that is more gradual than with other methods. Where the core and shell colors are the same, the transition becomes even less noticeable.

As with the above described rotational molding methods, the alternative method of introducing foaming agent alone into the mold to produce a foam core is compatible with methods for producing a multi-layer polymer shell. Specifically, a second polymeric material can be introduced into the mold before the foaming agent is distributed, so as to form a second molten shell of the second polymeric material on the inside of the first shell of molten polymeric material. The second polymeric material can be introduced into the mold by any of the methods described above—e.g. as larger size particles or particles with a higher melting point placed in the mold at the outset, or from a drop box later during the molding process, etc. The foaming agent is dispersed last of all, and mixes with an unmelted portion of the second polymeric material, that of the inner shell. The foam core is then formed of the second polymeric material inside the inner shell. In this embodiment, the second polymeric material can be of a species that is different from that of the first polymeric material.

In yet another alternative embodiment of the method, a subsequent polymer material can be introduced into the mold after the foaming reaction has taken place to form another shell or shell-type layer inside the foam layer. By this method, an article can be produced having an outer skin, a foam material next to the outer skin, and an inner skin inside the foam material. Such an article would essentially provide a hollow shell with a foam-filled skin.

By way of example, and without limitation, the invention can be described as a method for making a molded article, comprising the steps of introducing polymeric material into a mold having an inside, rotating the mold while heating it to a first temperature, so as to form a molten outer shell of a first portion of the polymeric material on the inside of the mold, causing a foaming agent to distribute within the mold and mix with an unmelted second portion of the polymeric material inside the shell, rotating the mold while continuing to heat it so as to distribute the mixture of the second portion of the polymeric material and foaming agent throughout the mold to melt and form a second shell inside the outer shell, and rotating the mold while heating it to a second higher decomposition temperature to allow the foaming agent to cause expansion of the second portion of the polymeric material on the inside of the outer shell, so as to form an expanded foam core within an interior region of the shell.

As another example, the invention can be described as a method for making a molded article, comprising the steps of placing polymeric material in particulate form into a mold having an inside, rotating the mold while heating it to a first elevated temperature, so as to melt a first portion of the polymeric material to form a molten outer shell of the polymeric material on the inside of the mold, distributing a foaming agent, in particulate form, within the mold, rotating the mold to cause the foaming agent to spread and mix with a second unmelted portion of the polymeric material, and rotating the mold while heating it to a second higher decomposition temperature, so as to cause the second portion of the polymeric material that is mixed with the foaming agent to expand to form an expanded polymer foam core inside the shell.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for making a molded article; comprising the steps of:
    a) introducing polymeric material without a foaming agent into a mold having an inside surface;
    b) rotating the mold while heating the material to a first temperature, so as to form a molten shell with molten polymeric material from a portion of the polymeric material on the inside surface of the mold with an unmelted portion remaining inside the molten shell;
    c) subsequently causing a foaming agent alone to disperse within the mold and come into contact with the molten polymeric material after the polymeric material has formed the molten shell and mix with the remaining unmelted portion; and
    d) rotating the mold while heating the material to a second higher temperature, so as to allow the foaming agent to cause expansion of the remaining unmelted portion of the polymeric material, so as to form an expanded foam core within an interior region of the shell.

2. A method in accordance with claim 1, wherein the step of causing a foaming agent to disperse within the mold further comprises introducing the foaming agent into an interior of the mold from an external container.

3. A method in accordance with claim 2, wherein the external container includes an opening in communication with the interior of the mold, the opening being covered by a barrier configured to predictably fluidize to allow dispersion of the foaming agent.

4. A method in accordance with claim 3, wherein the barrier comprises a meltable barrier of polymeric material configured to melt at a known temperature.

5. A method in accordance with claim 4, wherein the meltable barrier comprises a polymer material of the same species as the polymeric material of the shell, such that the material of the melted barrier substantially mixes with and becomes an integral and substantially indistinguishable part of the molded article.

6. A method in accordance with claim 2, wherein the external container is a drop box attached to an exterior of the mold.

7. A method in accordance with claim 1, wherein the step of causing a foaming agent to disperse within the mold comprises placing a meltable container of foaming agent into the mold prior to rotating the mold and heating it, the meltable container being configured to melt and release the foaming agent within the mold at a predictable temperature.

8. A method in accordance with claim 7, wherein the step of placing a meltable container of foaming agent into the mold comprises placing a plurality of meltable containers of foaming agent into the mold prior to rotating the mold and heating the polymeric material.

9. A method in accordance with claim 8, wherein the plurality of meltable containers of foaming agent are of a standard size, such that a discrete number of meltable containers are selected for the mold depending upon a size of the mold.

10. A method in accordance with claim 7, wherein the meltable container comprises a polymer material of the same species as the polymeric material of the shell, such that the material of the melted container substantially mixes with and becomes an integral and substantially indistinguishable part of the molded article.

11. A method in accordance with claim 1, further comprising the step of allowing the mold to cool while continuing to rotate it.

12. A method in accordance with claim 1, further comprising the step of placing a reinforcing member in the mold prior to steps (b) (c) and (d), so as to allow the reinforcing member to become substantially encased within the foam core.

13. A method in accordance with claim 12, wherein the step of placing a reinforcing member into the mold comprises placing a reinforcing member having a neutral axis substantially along a shrink-neutral axis of the molded article, so as to resist shrinkage-related deformation of the molded article.

14. A method in accordance with claim 13, further comprising the step of placing attachment point devices in the mold prior to steps (b) (c) and (d), so as to provide attachment points for connecting external structure to the molded article and causing the attachment point devices to become substantially encased within the foam core.

15. A method in accordance with claim 12, wherein the reinforcing member is configured to resist adhesion with the foam core material.

16. A method in accordance with claim 1, wherein the article comprises a table top, the mold defining an interior cavity having a shape of a table top.

17. A method in accordance with claim 16, further comprising the step of placing a structural frame in the mold prior to steps (b) (c) and (d), so as to allow the frame to become substantially encased within the foam core.

18. A method in accordance with claim 17, wherein the step of placing a structural frame in the mold comprises placing a structural frame having a neutral axis along a shrink-neutral axis of the tabletop, so as to resist shrinkage-related deformation of the tabletop.

19. A method in accordance with claim 16, further comprising the step of placing attachment point devices in the mold prior to steps (b) (c) and (d), so as to provide attachment points for connecting support structure for the table on an underside of the tabletop to become substantially encased within the foam core.

20. A method in accordance with claim 1, further comprising the step of introducing a second polymeric material into the mold before causing the foaming agent to disperse within the mold, so as to form a second molten shell of the second polymeric material on the inside of the aforesaid shell of molten polymeric material, the foaming agent coming into contact with the second molten polymeric material.

21. A method in accordance with claim 20, wherein the second molten polymeric material is of a species different from that of the aforesaid polymeric material.

22. A method in accordance with claim 1, wherein the steps of rotating the mold while heating it comprise rotating the mold in a multi-axis rotational molding mechanism.

23. A method in accordance with claim 1, wherein the foaming agent is selected from the group consisting of azodicarbonamide foaming agents and sodium bicarbonate-based foaming agents.

24. A method in accordance with claim 1, wherein a shape of the mold varies from an intended finished shape of the molded article, such that post-molding shrinkage-related deformation of the molded article will cause the shape of the molded article to substantially conform to an intended finished shape.

25. A method for making a molded article, comprising the steps of:
  a) placing polymeric material in particulate form and without a foaming agent into a mold having an inside surface;
  b) rotating the mold while heating the polymeric material to a first elevated temperature, so as to melt a portion of the polymeric material and form a molten shell of the polymeric material on the inside surface of the mold with an unmelted portion of the polymeric material remaining inside the molten shell;
  c) dispersing a foaming agent alone, in particulate form, within the mold subsequent to the polymeric material forming the molten shell;
  d) rotating the mold to cause the foaming agent to spread and adhere to and mix with the remaining unmelted portion of the polymeric material; and
  e) rotating the mold while heating the polymeric material and foaming agent to a second higher temperature, so as to cause the remaining unmelted portion of the polymeric material that is mixed with the foaming agent to expand to form an expanded polymer foam core inside the shell.

* * * * *